Figure 1:
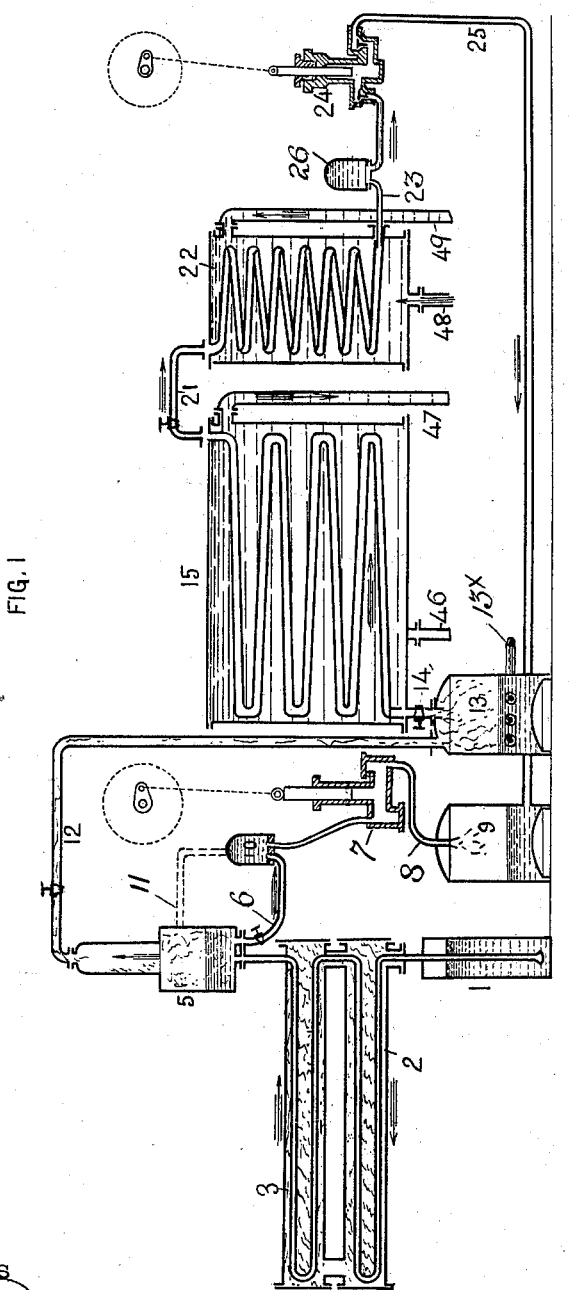

No. 611,404. Patented Sept. 27, 1898.
L. M. H. R. BAUDOIN & P. E. L. SCHRIBAUX.
APPARATUS FOR CONCENTRATING LIQUIDS.
(Application filed Oct. 8, 1895.)
(No Model.) 2 Sheets—Sheet 1.

Witnesses

Inventors

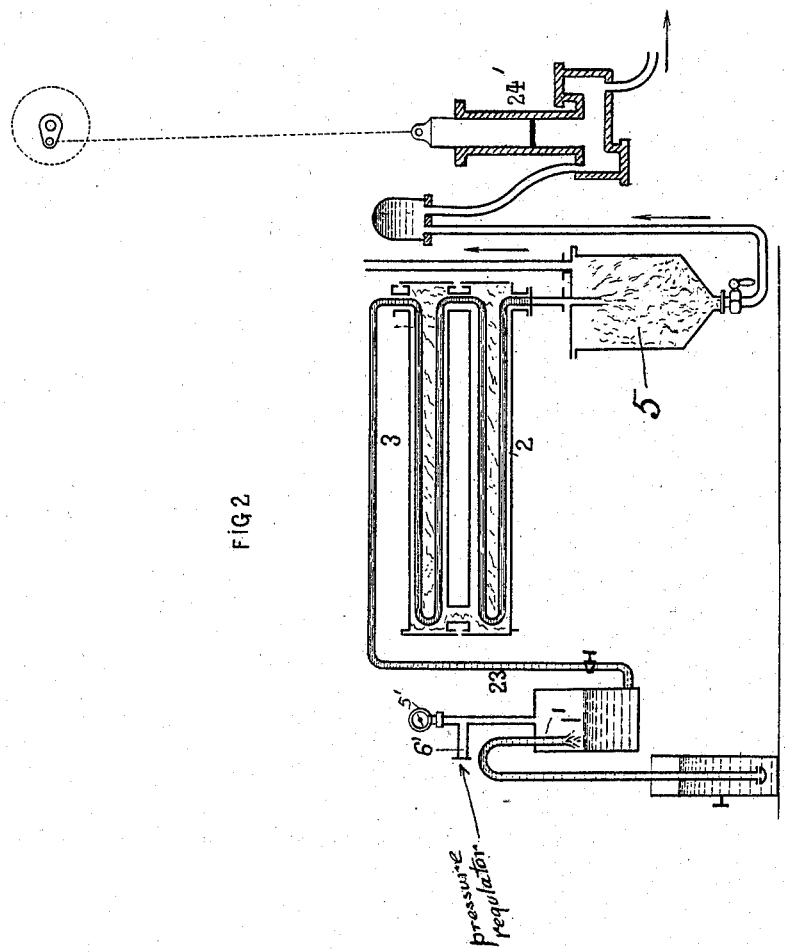

UNITED STATES PATENT OFFICE.

LOUIS MARIE HENRI ROBERT BAUDOIN AND PIERRE EMILE LAURENT SCHRIBAUX, OF PARIS, FRANCE.

APPARATUS FOR CONCENTRATING LIQUIDS.

SPECIFICATION forming part of Letters Patent No. 611,404, dated September 27, 1898.

Application filed October 8, 1895. Serial No. 565,072. (No model.)

*To all whom it may concern:*

Be it known that we, LOUIS MARIE HENRI ROBERT BAUDOIN and PIERRE EMILE LAURENT SCHRIBAUX, citizens of France, and residents of Paris, in the Department of the Seine, France, have invented new and useful Improvements in Apparatus for Concentrating Liquids, of which the following is a specification.

This invention consists of an apparatus adapted to condense any liquids containing, in the shape of useful matter, both fixed and volatile substances and to reduce them to a small volume.

The liquids with which our invention may be used are of two sorts: first, liquors used as beverages—such as wine, cider, beer, and the like—the normal constituent elements of which (excepting water) it is desired to preserve, and, second, solutions obtained by a treatment of a great variety of substances with volatile solvents—such as water, alcohol, ether, sulfuret of carbon, and the like—which solvents it is in some cases useful to recover or reproduce after use.

The invention will be best understood by reference to the accompanying drawings, showing, by way of example, a complete concentrating apparatus constructed and fitted up in accordance with our invention in the form or condition in which we consider it to be best fitted for practical purposes, though it will of course be understood that we by no means confine ourselves to the particular mode or performance of our invention which the drawings represent or to the details and accessory parts shown, or to the method illustrated of combining or connecting the several parts of the apparatus, all of which features may vary extensively without any departure from the principle of our invention.

In the drawings, Figure 1 is a diagram of the main parts of the apparatus, enabling an idea to be formed of its general operation or the coöperation of its several parts as it takes place during one cycle of operations. Fig. 2 is a diagram representing a modification of the construction of certain parts of the same apparatus.

For the purpose of illustration we will suppose that it is desired to concentrate wine. The wine to be treated is drawn in by the alcohol-pump through a tube 1, Fig. 1, which tube conducts it into the various component elements of the evaporating or wine-heating apparatus. This apparatus is formed with a simple continuous pipe forming an extension of the tube 1 and bent at several points of its length within two long sleeves 2 3, connected by their ends, and in which there circulates the exhaust-steam from a steam-engine. The wine passing through in this tube is brought to the boiling-point before it can enter the separator or "froth-breaker" 5, consisting of a single elongated cylindrical receiver. In this receiver the vapors are separated from the liquid, which remains in the receiver in the condition of hot extract at the bottom of the separator, from whence a pipe 6 conveys it by way of the chamber 10 to the pump 7, which draws it in and forces it through the pipe 8 into the receiver 9, where the extract is mixed with alcohol. Suitable means (not shown) are arranged in the pump to secure this action.

The constituent portions of the apparatus may be arranged in the manner illustrated in Fig. 2, which arrangement differs from the one first described in the following particulars: The liquid before entering the coil 3 passes through the receiver 1', and thence it passes into the coil 3. The liquid after this reaches the separator 5, the remaining parts of the apparatus being the same as thus shown in Fig. 1.

Referring again to the main form of the apparatus shown by Fig. 1, at some suitable position along the course which the extract is to follow in flowing from the separator 5 to the pump 7 there is interposed a test-glass for ascertaining the condition of the extract. This test-glass consists of a glass globe 10, firmly secured onto a horizontal dish or plate. Through the transparent walls of this globe (or dome) the extract, which is caused to pass through it on its way, is visible, whereby a reliable check is placed on the operation of the battery. The pipe 11, which connects the separator 5 with the interior of the dome or globe 10, serves to balance the pressure within the two receivers or chambers. The vapors, being a mixture of water and alcohol, ether, and other volatile products, hereinafter to be described as "alcoholic vapors," and which have been separated from the extract in the separator 5, pursue their course and thus arrive at the pipe 12, provided at the top of a receiver 13, which is capable of being heated internally by a steam-coil, as shown in Fig. 1 at 13. A portion of the vapor is condensed in the receiver, while the remainder passes into the pipe 14, the retrograding or concentrating apparatus being an extension of the said pipe wound in the shape of a rising serpentine coil and inclosed within an outer casing 15, wherein there circulates a current of water, the temperature and quantity of which should as far as practicable be regulated in such a manner that the aqueous portion of the vapor alone may be condensed within the coil. The condensation-water descends into the receiver 13. This receiver is at its lower part provided with a short petcock which enables samples of the condensation water to be drawn off to ascertain the proportion of alcohol which it contains. Unless this proportion is quite insignificant the receiver 13 is heated by sending steam through the coil which it contains. The alcoholized water (a mixture of water and alcohol) is reconverted into steam and conveyed back to the retrograding apparatus, the cooling power of which is so controlled that the water as it drops into the receiver 13 shall contain no more alcohol. The vapors which have passed through the retrograding apparatus without condensing are carried by the pipe 21 into the alcoholic vapor-condenser, which is nothing but a cooled serpentine coil heated externally by a current of water circulating through the tank 22. The whole of the alcoholic vapor is condensed within this coil, and the resulting liquid drawn into the pipe 23 by the pump 24 is next forced through the pipe 25 into the receiver 9, where it becomes mixed with the extract contained therein. On its way from the condenser 22 to the pump 24 the liquid passes a device for testing alcohol 26, placed upon the pipe 23 and identical with the extract-testing glass 10, which arrangement enables the speed of circulation of the said liquid and the rate at which the apparatus delivers or supplies the final product at the time to be at any moment readily ascertained.

The mixture of extract and alcohol, ether, and other useful components of the wine being treated, with the exclusion only of the water it contained, constitutes that which is the object of the apparatus to produce—viz., concentrated wines capable of being introduced into the market in a compact shape or in a small volume.

The apparatus just described thus comprises means for circulating steam for the purpose of heating the liquids to be treated and means for circulating water for cooling the condensed coils.

The steam which is employed in heating the apparatus is preferably exhaust-steam.

We claim—

1. An apparatus for concentrating liquids, consisting of a chamber in which the extract is separated from the volatile products of the wine, and alcoholic-vapor condenser connected with the separating-chamber to receive the alcoholic vapors therefrom, and an interposed separator for the steam carried off from the separating-chamber, said separator comprising a receiver through which the whole volume of vapor is passed, a retrograding device between the said receiver and the alcoholic-vapor condenser, said retrograding device being adapted to condense the steam without condensing the alcoholic vapors, and means for heating the receiver to reconvert the condensation water into steam to be again acted on by the retrograder, substantially as described.

2. In combination the sleeves 2, 3, arranged parallel having connection with a steam-supply, the wine-pipe extending circuitously through said sleeves, the separator 5, the receiving-chamber 9, connected with the lower part of said separator, the test-glass 10 arranged in the said extract-pipe, the pump for forcing the wine to and from the separator, the receiver 13, connected by a vapor-pipe with the receiver 5, means for heating said receiver 13, the retrograding apparatus comprising the pipe 14 connected with the chamber 13, and the water-casing 15, the condenser for the alcoholic vapors connected with the pipe 14 and the connection from the condenser to the receiver 9, said heater of the receiver 13 serving to pass the alcoholic vapors from the said receiver while allowing the steam to condense therein, substantially as described.

In testimony whereof we have signed this specification in the presence of two subscribing witnesses.

LOUIS MARIE HENRI ROBERT BAUDOIN.
PIERRE EMILE LAURENT SCHRIBAUX.

Witnesses:
CLYDE SHROPSHIRE,
M. TOUY.